Feb. 26, 1957  A. L. AMEND  2,782,520
LOCATING FIXTURE
Filed March 31, 1955
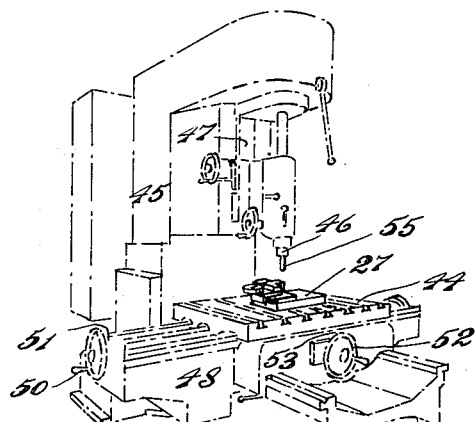
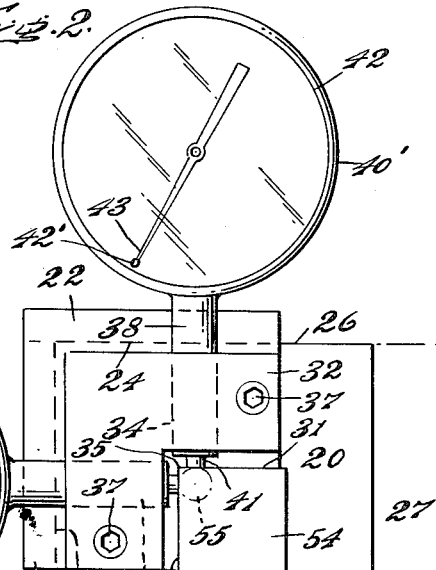
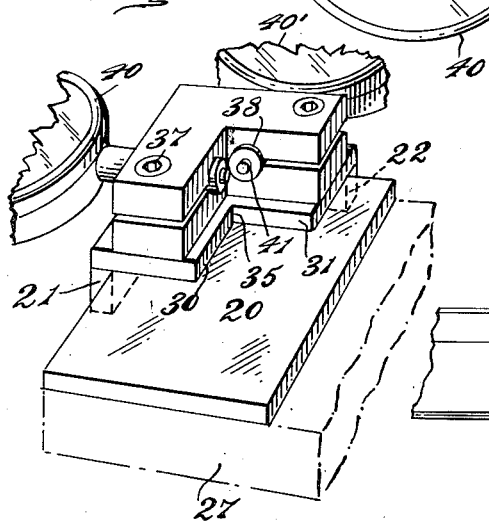
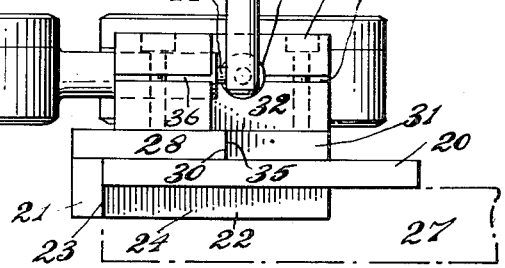
INVENTOR
Arthur L. Amend.
BY
ATTORNEYS.

United States Patent Office 2,782,520
Patented Feb. 26, 1957

2,782,520

LOCATING FIXTURE

Arthur L. Amend, Oakford, near Langhorne, Pa.

Application March 31, 1955, Serial No. 498,231

3 Claims. (Cl. 33—185)

The present invention relates to locating fixtures for use on jig borers and the like and to methods of locating.

A purpose of the invention is to simplify and shorten the time required for locating work on a jig borer, jig miller, or similar devices.

A further purpose is to position a fixture at the corner of the work, to zero opposed dial indicator gauges with respect to the locating surfaces on the fixture, to bring the spindle of the machine tool in the same relation with respect to the fixtures and then to set the indexes of the longitudinal and cross feed of the machine tool at zero.

Further purposes appear in the specification and in the claims.

In the drawings I have chosen to illustrate only one of the numerous embodiments in which my invention may appear, selecting the forms shown from the standpoints of convenience in illustration, satisfactory operation and clear demonstration of the principles involved.

Figure 4 is a fragmentary side elevation showing the fixture and the work with the rod engaging the dial indicator gauges.

In the drawings like numerals refer to like parts.

Figure 1:
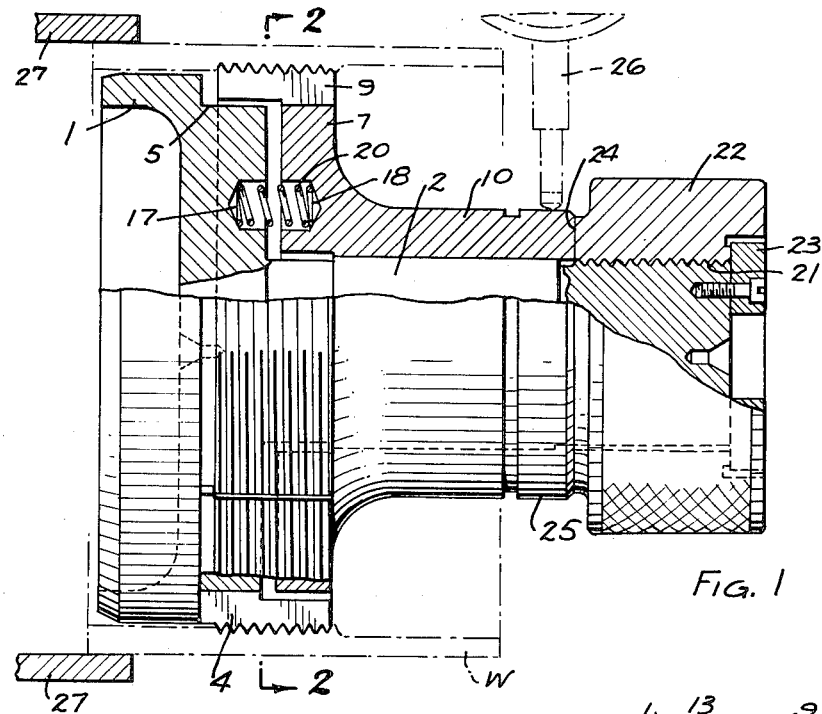
Figure 1 is a perspective showing the device of the invention in position on a jig borer or similar machine tool.
Figure 3:
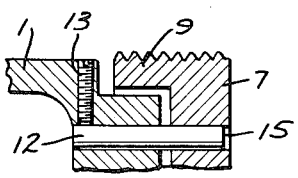
Figure 3 is a fragmentary perspective showing the fixture of the invention.

In the prior art the setup of work on a jig borer, jig miller or similar machine tool has required considerable time and often necessitated accurate measurement. The present invention is designed to simplify the essential mounting of the work on the jig borer or miller, reducing the time and increasing the accuracy.

In accordance with the invention, a setup fixture is used having a base 20, suitably a flat plate, which is provided at one corner with downwardly extending corner locating strips 21 and 22, which have precisely machined right angle downward corner-engaging faces 23 and 24 which engage accurately machined right angle corner surfaces 25 and 26 on the work 27.

The base mounts an upward locating plate 28 which has an upperly extending locating surface 30 precisely parallel to the downwardly extending surface 23 and an upwardly extending locating surface 31 accurately at right angles to the locating surface 30 and precisely parallel to the downwardly extending locating surface 24.

Above the plate 28 is secured a clamping bracket plate 32 of angular formation having openings 33 and 34 at right angles to one another and having axes equidistant from the corner 35 formed by upper locating surfaces 30 and 31 and respectively at right angles to these surfaces. At each side toward the outside a slit 36 is cut horizontally into the openings 33 and 34 and clamping screws 37 extend across the slit and serve to clamp the projecting ends 38 of dial indicator gauges 40 and 40' which have plungers or feelers 41 at the axis which in release position extend beyond the respective upward locating surfaces 30 and 31.

The indicator gauges have dials 42 with zero marks 42' which are visible and show the positions of pointers 43 on the dials.

In operation of the device, the work 27 is placed on the horizontal table 44 of a jig borer or jig miller having a standard 45 which supports a spindle 46 intending to carry the tool. The spindle is vertically adjustable on guides 47 as well known.

The table has a longitudinal feed 48 adjusted by an adjustment handle 50 having an adjustable index at 51 and is adjustable by a cross feed manipulated by a suitable handle 52 having an adjustable index 53. These adjustable indexes are well known.

In using the device the work 27 is set up on the table 44 and clamped thereto by means not shown. The fixture of the invention is then placed on the corner of the work with lower locating surfaces 23 in engagement with surface 25 of the work and lower locating surface 24 in engagement with surface 26 of the work.

A suitable rectangular gauge block 54 is placed on base 20 and its accurately rectangular sides are brought into engagement with the upper locating surface 30 and the end of the feeler 41 of gauge 40 and also with the upper locating surface 31 and the end of the feeler 41 of gauge 40'.

As the feelers formerly protruded beyond the surfaces 30 and 31 the feelers are depressed and the pointers are no longer at zero on the dial indicators. The zeros on the dial indicators are then adjusted until both dial indicators read zero with the block 54 in place as described.

Figure 2:
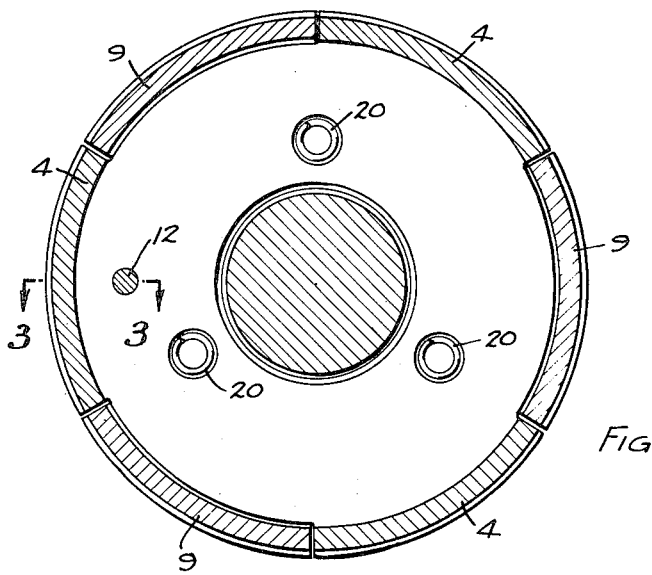
Figure 2 is a fragmentary plan view of the fixture of the invention in place on the work, and engaging a block.

The block 54 is then removed and an accurately round and straight rod 55 is secured in the spindle of the machine tool. The diameter of the rod 55 is the same as the distance on the axis of one of the dial indicator gauges from a position immediately above the adjoining upper locating surface to the axis of the other dial indicator gauge. This is shown in Figure 2.

The spindle is advanced until the lower end of the rod is below the feelers 41 of the dial indicator gauges and in the space formerly occupied by the block 54, and then the longitudinal and cross feeds of the table 44 are manipulated until the rod engages the feelers 41 of both dial indicator gauges symmetrically and both dial indicator gauges read zero.

The rod and the spindle are then at the position established by the corner of the block 54 which has been accurately located with respect to the corner of the work.

With the spindle thus positioned, the indexes on the longitudinal and cross feeds of the machine tool are set to zero. From then on using this zero setting the table 44 can be manipulated for the required cuts with the assurance that the work has been properly located. The fixture of the present invention is then removed from the work, having performed its function.

While it is desirable to employ the block 54 to adjust the dial indicator gauges initially to zero, it will be evident that the rod 55 mounted in the machine tool spindle can less desirably be used for this purpose. In that case the rod must be brought into lateral engagement with the upper locating surfaces 30 and 31.

In view of my invention and disclosure variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention, what I claim as new and desire to secure by Letters Patent is:

Feb. 26, 1957  J. J. PARKER ET AL  2,782,521
TOOL FOR GAUGING THREADS ON WORK PIECES
Filed Aug. 21, 1953  3 Sheets-Sheet 1

INVENTORS
JOHN J. PARKER &
LONDON T. MORAWSKI.
BY
ATTORNEYS.